(12) United States Patent
Tillner

(10) Patent No.: US 7,772,493 B2
(45) Date of Patent: Aug. 10, 2010

(54) ELECTRICAL WINDING CONDUCTOR WITH A RECTANGULAR CROSS SECTION

(75) Inventor: Dipl.-Ing.Siegbert Tillner, Erndtebruck (DE)

(73) Assignee: Essex Europe (FR)

( * ) Notice: Subject to any disclaimer, the term of this patent is extended or adjusted under 35 U.S.C. 154(b) by 0 days.

(21) Appl. No.: 12/229,722

(22) Filed: Aug. 26, 2008

(65) Prior Publication Data

US 2009/0078448 A1    Mar. 26, 2009

(30) Foreign Application Priority Data

Sep. 25, 2007   (EP) .................................. 07291138

(51) Int. Cl.
*H01B 7/00* (2006.01)

(52) U.S. Cl. .............................. 174/110 R; 174/110 SR; 174/117 F; 174/117 FF

(58) Field of Classification Search ............. 174/149 B, 174/27, 26 R, 72 R, 72 B, 88 R, 113 R, 149 R; 310/208

See application file for complete search history.

(56) References Cited

U.S. PATENT DOCUMENTS

| | | | | |
|---|---|---|---|---|
| 2,805,472 | A * | 9/1957 | Botts et al. | 29/609 |
| 3,312,773 | A * | 4/1967 | Lit | 174/119 R |
| 4,329,538 | A * | 5/1982 | Meyer | 174/119 R |
| 4,704,170 | A * | 11/1987 | Priaroggia | 156/53 |
| 6,051,793 | A * | 4/2000 | Byrne et al. | 174/120 R |
| 6,657,122 | B1 * | 12/2003 | Krenzer et al. | 174/149 B |
| 6,680,120 | B1 | 1/2004 | Nagel et al. | 428/383 |

FOREIGN PATENT DOCUMENTS

EP    1079500    2/2001

* cited by examiner

*Primary Examiner*—William H Mayo, III
(74) *Attorney, Agent, or Firm*—Sofer & Haroun, LLP

(57) ABSTRACT

An electrical winding conductor (1) with a rectangular cross section is specified in order to produce an electrical winding for electrical appliances which contain a liquid, which is used as a coolant and in which the winding is immersed in the in-use position. In order to improve the cooling, raised areas (2) composed of insulating material are fitted at a distance from one another on at least one side of the winding conductor (1), over its entire length.

5 Claims, 2 Drawing Sheets

ELECTRICAL WINDING CONDUCTOR WITH A RECTANGULAR CROSS SECTION

RELATED APPLICATION

This application claims the benefit of priority from European Patent Application No. 07 291 138.1, filed on Sep. 25, 2007, the entirety of which is incorporated by reference.

FIELD OF THE INVENTION

The invention relates to an electrical winding conductor with a rectangular cross section for production of a winding for electrical appliances which contain a liquid, which is used as a coolant and in which the winding is immersed in the in-use position (EP 1 079 500 A1).

BACKGROUND

A winding conductor such as this is generally first of all provided with insulation and is then processed to form a winding, which, for example, is used in transformers or in electrical machines. The turns of the winding are insulated from one another. According to DE 199 03 137 A1, this can be done, for example, by application of lacquer layers or, using a different known technique, by winding paper around the winding conductor.

EP 1 079 500 A1, mentioned initially, describes an insulated winding conductor which is processed in a large number of layer elements, which are referred to as conductor elements, to form a so-called twisted conductor. A twisted conductor such as this is used, for example, as a winding for transformers which contain oil as a coolant. Its conductor elements lie with their flat faces closely and firmly on one another. The twisted conductor is provided with a surrounding winding composed of a perforated strip, to make it robust. The perforations are intended to allow better cooling of the twisted conductor.

OBJECTS AND SUMMARY

The invention is based on the object of designing the winding conductor described initially such that the cooling and the electrical insulation of a winding produced with the same are improved.

According to the invention, this object is achieved in that raised areas composed of insulating material are fitted at a distance from one another on at least one side of the winding conductor, over its entire length.

A winding which is produced using a winding conductor such as this has turns between which there are free spaces whose size is governed by the raised areas applied to the winding conductor. The turns are kept apart by the raised areas such that, during use, the liquid coolant and/or insulation medium, in particular oil, reaches each individual turn. Overall, this results in considerably better dissipation of the heat produced by the respective winding. The life of the winding is thus increased, in the same way as that of the appliance equipped therewith. The same advantages result when the winding conductor is used as a conductor element in a twisted conductor from which a corresponding winding is produced.

The raised areas provided on the finished winding conductor can be produced in various ways, to be precise for example as follows:

Raised areas in the form of points or circles, or as strips, composed of insulating material can be applied at a worthwhile distance from one another on the bare winding conductor or onto an already provided insulating layer.

An insulating layer to be applied to the winding conductor may have different thicknesses, with corresponding thickened areas once again being applied at sensible distances from one another.

Surrounding windings can be applied at a distance from one another around the bare winding conductor, or a winding conductor that has already been provided with an insulating layer.

BRIEF DESCRIPTION OF THE DRAWINGS

Exemplary embodiments of the subject matter of the invention are illustrated in the drawings, in which.

DETAILED DESCRIPTION

Figure 1:
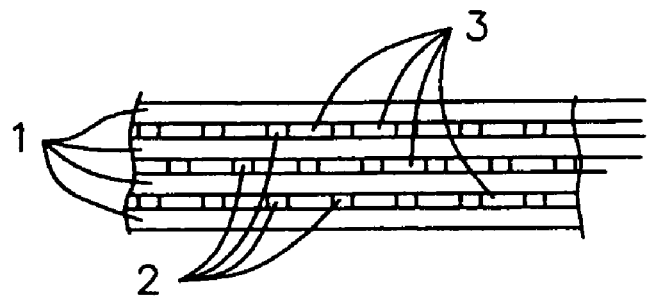
FIG. 1 shows a schematic illustration of a detail of a winding equipped with a winding conductor according to the invention.

FIG. 1 shows sections of four turns of a winding conductor 1, which is in the form of a flat wire with a rectangular cross section, and composed of copper, and the turns are held at a distance from one another by means of raised areas 2 composed of insulating material. The raised areas 2 are applied to at least one side of the winding conductor 1, advantageously to one of the two flat faces thereof, over its entire length and at a distance from one another, such that free spaces 3 remain between the turns, through which a coolant, in particular oil, can pass. However, it is also possible to use any other known coolant, for example a coolant based on ester. The raised areas 2 have an at least approximately constant height in all the embodiments.

Figure 2:
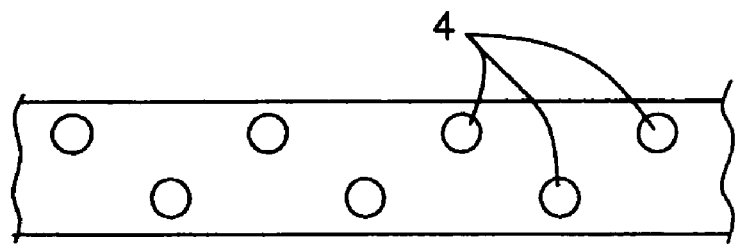
FIGS. 2 to 6 show various embodiments of a winding conductor, in the form of enlarged illustrations.

In FIG. 2, the raised areas 2 are raised areas 4 in the form of points or circles. They are at a sensible distance from one another which on the one hand is sufficiently large to form the free spaces 3, and on the other hand is designed to be sufficiently small that the turns of the winding conductor 1 cannot be bent through in a winding or in a twisted conductor. The raised areas 4 can be applied to a bare winding conductor 1 or else to a winding conductor 1 which has already been provided with an insulating layer. Raised areas 4 can also be applied to two mutually opposite faces of the winding conductor 1, although it is necessary to ensure that they do not collide with one another during production of a winding or of a twisted conductor.

Figure 3:
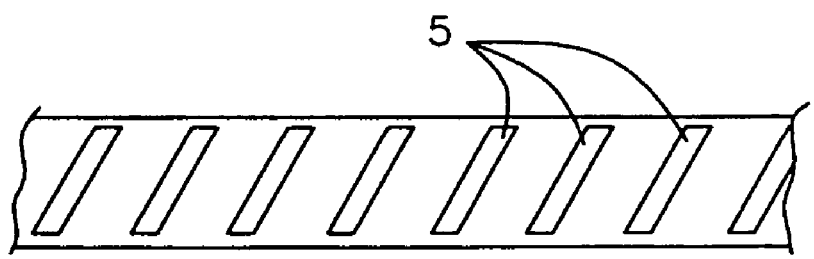

In one preferred embodiment shown in FIG. 3, instead of the raised areas 4 in the form of points or circles, it is also possible to apply raised areas 5 in the form of strips to the winding conductor 1, at a distance from one another. As is illustrated, the raised areas 5 in the form of strips may run at an angle to the longitudinal direction of the winding conductor 1, or may be arranged parallel to one another. They may, however, also run at right angles to the longitudinal direction of the winding conductor 1 and may also be arranged not parallel to one another. It is also possible to apply both raised areas 4 in the form of points or circles and raised areas 5 in the form of strips to a winding conductor 1, in any desired sequence.

Figure 4:
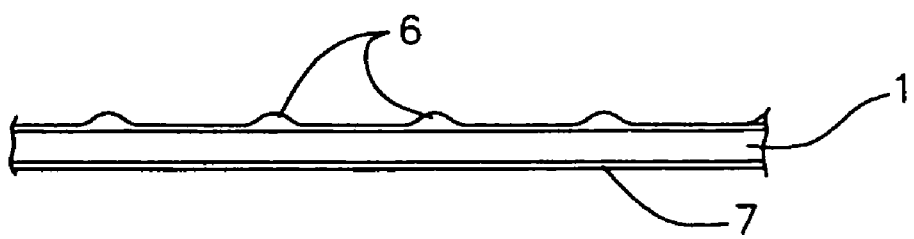

The raised areas 2 as shown in FIG. 4 may also be in the form of thickened areas or thickenings 6 of an insulating layer 7 which is applied to a winding conductor 1 and is composed, for example, of a lacquer, using a conventional technique. The arrangement of the thickened areas 6 is governed by the same factors as the raised areas 4 in the form of points or circles.

Figure 5:
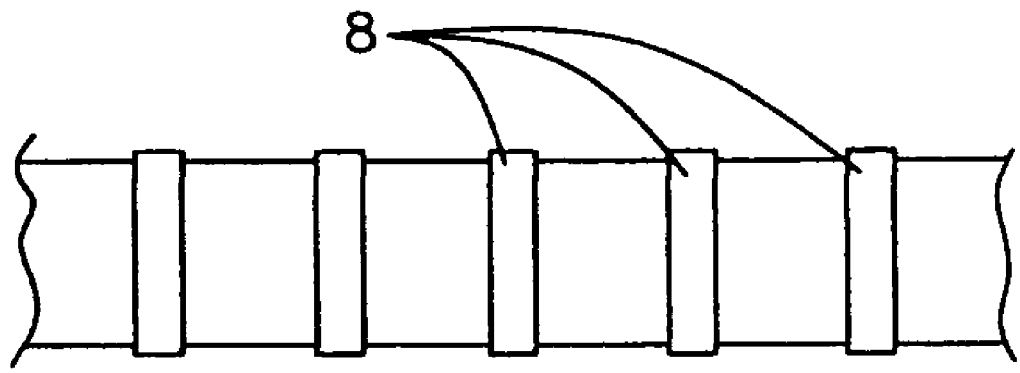

In a further embodiment, the winding conductor 1 as shown in FIG. 5 may also be provided with surrounding windings 8, which surround the same at a distance from one another. The surrounding windings 8 may once again be applied to a bare winding conductor 1 or to an already insulated winding conductor 1. They are advantageously composed of paper.

Figure 6:
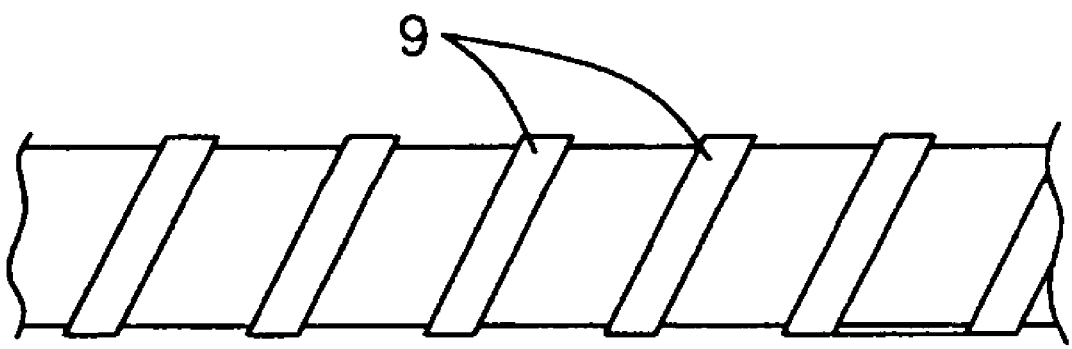

As shown in FIG. 6, the raised areas 2 may also be formed by a strip 9 which is wound around the winding conductor 1 with a long lay length, leaving gaps free. This strip 9 may also be wound around a bare winding conductor 1, or an already insulated winding conductor 1. It is preferably composed of paper.

The invention claimed is:

1. Electrical winding conductor with a rectangular cross section for production of an electrical winding for electrical appliances which contain a liquid, which is used as a coolant and in which the winding is immersed in the in-use position,
   wherein raised areas, composed of insulating material, are fitted at a distance from one another on at least one side of the winding conductor, over its entire length generating free spaces between the turns of the winding conductor within an electrical winding for the passage of the cooling liquid.

2. Winding conductor according to claim 1, wherein the raised areas are raised areas in the form of strips.

3. Winding conductor according to claim 1, wherein the raised areas are raised areas in the form of points or circles.

4. Winding conductor according to claim 1, wherein the raised areas are formed by thickened areas of insulation surrounding the winding conductor.

5. Winding conductor according to claim 1, wherein the raised areas are formed by surrounding windings of the winding conductor arranged at a distance from one another.

* * * * *